United States Patent
Eika

(10) Patent No.: US 7,601,055 B2
(45) Date of Patent: Oct. 13, 2009

(54) GAME APPARATUS, GAME METHOD, AND PROGRAM

(75) Inventor: Takuro Eika, Tokyo (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 474 days.

(21) Appl. No.: 10/813,211

(22) Filed: Mar. 29, 2004

(65) Prior Publication Data
US 2004/0235543 A1    Nov. 25, 2004

(30) Foreign Application Priority Data
Mar. 31, 2003    (JP) ............................. 2003-094104

(51) Int. Cl.
*A63F 9/24* (2006.01)
*A63F 13/00* (2006.01)
*G06F 17/00* (2006.01)
*G06F 19/00* (2006.01)

(52) U.S. Cl. ................ 463/6; 463/30; 463/31; 463/37; 463/38; 463/43; 463/44

(58) Field of Classification Search ............ 463/6, 463/30, 31, 37, 38, 43, 44
See application file for complete search history.

(56) References Cited

U.S. PATENT DOCUMENTS 5,474,453 A * 12/1995 Copperman .......... 434/29
5,707,237 A * 1/1998 Takemoto et al. ........ 434/69
5,921,780 A * 7/1999 Myers .................. 434/69

FOREIGN PATENT DOCUMENTS

| EP | 0872266 A1 * | 10/1998 |
|---|---|---|
| EP | 1029569 A2 * | 8/2000 |
| JP | 2000-350867 | 12/2000 |

* cited by examiner

*Primary Examiner*—Dmitry Suhol
*Assistant Examiner*—Jason Pinheiro
(74) *Attorney, Agent, or Firm*—Townsend and Townsend and Crew LLP

(57) ABSTRACT

There is provided a game apparatus for moving a moving object on a road in a virtual world and changing influence received by the moving object from the road based on movement history, wherein an input reception unit receives operational input from a player, a storage unit stores position and velocity of the moving object and road condition, a calculation unit calculates the acceleration of the moving object based on the received operational input, a stored current position of the moving object, and the road condition at this position, an update unit updates the stored position and velocity of the moving object in accordance with the calculated acceleration and updates the stored road condition in accordance with a change in at least one of position, velocity, and acceleration of the moving object, and a display unit displays at least one of the stored position and velocity of the moving object.

9 Claims, 10 Drawing Sheets

(EXPANDED VIEW)

GAME APPARATUS, GAME METHOD, AND PROGRAM

CROSS-REFERENCE TO RELATED APPLICATIONS

This application is based on Japanese patent Application No. 2003-94104 filed on Mar. 31, 2003 and including specification, claims, drawings and summary. The disclosure of the above Japanese Patent Application is incorporated herein by reference in its entirety.

BACKGROUND OF THE INVENTION

1. Field of the Invention

The present invention relates to a game apparatus and game method for moving a moving object on a road in a virtual world and changing an influence received by the moving object from the road based on a history of the object's movement, and a program for realizing these on a computer.

2. Description of the Related Art

There has conventionally been provided a racing game where a player participates as a driver and drives a vehicle or a motorcycle, moves in a virtually set world in the vehicle, and enjoys a competition with other players and players controlled by a computer. In a real car race or the like, when a vehicle runs on the road, the rubber of the tires peels off and sticks to the road, thereby increasing the friction between the tires of the running vehicle and the road and changing the gripping characteristic.

Therefore, in order to realize a realer racing game, etc., it is necessary to simulate how a moving object such as a vehicle moving in a virtual world produced by a game moves, by taking into consideration influences received by a road due to the moving object's movement and influences received by the moving object from the road changed in its condition due to its received influences. Techniques for realizing such a simulation is required for a game apparatus having limited hardware resources and required to have real-timeness.

SUMMARY OF THE INVENTION

The present invention was made for solving the above-described problem, and an object of the present invention is to provide a game apparatus and game method for moving a moving object on a road in a virtual world, and changing an influence received by the moving object from the road based on a history of movement, and a program for realizing those on a computer.

To achieve the above object, the following invention will be disclosed in accordance with the principle of the present invention.

A game apparatus according to a first aspect of the present invention moves a moving object on a road in a virtual world, and comprises an input reception unit, a storage unit, a calculation unit, and an update unit, which are structured as follows.

The input reception unit receives an operational input from a player. The player gives an operational input to the game apparatus by operating a controller attached to the game apparatus as a standard equipment, or various other input devices, such as a steering-wheel-shaped controller, a brake-shaped controller, a gearlever-shaped controller, etc.

The storage unit stores a condition of the moving object (including a position of the moving object), and a road condition of the road. As a typical example, the storage unit stores a velocity of the moving object as the condition of the moving object. As will be described later, the position and velocity of the moving object and the road condition which are stored in the storage unit are updated along with the lapse of time.

In a case where the moving object is a vehicle, the storage unit stores various information such as the weight of the vehicle, the posture of the steering wheel, the type and wear amount of the tires, the rotation number, temperature, and output of the engine, the current position of the gearlever, the gear rate, the position of the clutch, etc. Further, the storage unit may store, as the road condition, a later-described passage number of the moving object, the type of the road (whether the road is composed of asphalt, gravel, dirt, or tarmac, whether it is raining, whether the vehicle is on the course or off the course, whether the vehicle is on grass when it is off the course, etc.)

The calculation unit calculates an influence received by the moving object based on the received operational input from the player, a stored current position of the moving object, and the road condition at the current position. For example, in a case where the vehicle runs on a road, the vehicle receives various influences in accordance with the current road condition. For example, the frictional force (gripping force) received by the vehicle changes, or the degree of vibration of the vehicle changes. Hence, the calculation unit calculates these influences.

The update unit updates the stored condition of the moving object in accordance with the calculated influence, and updates the stored road condition in accordance with a change in the condition of the moving object. For example, when a racing car runs on a road, the rubber of the tires peels off the tires due to the friction between the tires and the road, and the color and the frictional force of the road change. Hence the update unit updates these changes as the road condition.

According to the present invention, it is possible to move a moving object on a road in a virtual world and simulate a realer movement of the moving object by calculating the influence received by the moving object from the road based on the road condition at the current position of the moving object and changing the road condition in accordance with a change in the condition of the moving object.

In the game apparatus according to the present invention, the storage unit may further store a velocity of the moving object as the condition of the moving object, the calculation unit may calculate an acceleration of the moving object as the influence received by the moving object, and the update unit may update the stored position and velocity of the moving object in accordance with the calculated acceleration.

In order to calculate the acceleration in a case where a vehicle runs on a road, it is necessary to obtain the frictional force between the contact surface of the tire and the tire. Hence, the calculation unit checks the road condition at the current position of the vehicle and determines the acceleration of the vehicle based on the checked road condition, other information stored in the storage unit, and the operation of the player.

The velocity can be obtained by integrating the acceleration and the position can be obtained by integrating the velocity. Typically, the update unit carries out update at each predetermined time interval. The increment of the velocity is obtained by multiplying the acceleration calculated by the calculation unit by the time interval. The increment of the position is obtained by multiplying the average of the current velocity and a "velocity obtained by adding the increment to the current velocity" by the time interval. Further, the update unit updates the road condition stored in the storage unit by taking into consideration the influence caused by the moving object's contacting the road.

According to the present invention, it is possible to realize a game apparatus which moves a moving object on a road in a virtual world, changes the influence received by the moving object from the road based on the history of movement, and causes the acceleration of the moving object to be changed in accordance with the change in the influence.

In the game apparatus according to the present invention, the storage unit may store a reference frictional force at each position on the road as the road condition, the calculation unit may calculate the acceleration of the moving object by obtaining a frictional force given to the moving object by changing the stored "reference frictional force at the current position of the moving object on the road" in accordance with a stored "current condition of the moving object".

In case of a racing game, for example, the racing game is programmed such that a reference gripping force (reference frictional force) is pre-set for each position on the road. The effective frictional force received by the vehicle is obtained by correcting this reference frictional force in accordance with the current velocity or the like of the vehicle (for example, the weight of the vehicle, the mileage cumulated so far, etc.).

The present invention corresponds to a preferred embodiment of the above-described game apparatus. According to the present invention, it is possible to realize a realer racing game in which the reference gripping force varies from a position to position on the road, and the varied reference gripping force is changed in accordance with the condition of the vehicle.

In the game apparatus according to the present invention, the display unit may display at least one of the stored position and velocity of the moving object. In a racing game, for example, the display unit displays the way how the external world looks when seen from the driver's seat of the vehicle and the position and direction of the vehicle in the course, and also displays the current velocity of the vehicle by means of a speedometer. Other than this, the display unit may further display various information such as the rotation number and temperature of the engine and the position of the gearlever which are stored in the storage unit.

According to the present invention, it is possible to realize a game apparatus which notifies the player of the position and velocity of the moving object in the virtual world.

In the game apparatus according to the present invention, the storage unit may store, as the road condition, a passage number representing a number of times the moving object passes through a predetermined position on the road, the update unit may update the stored passage number of the moving object in accordance with a change in the stored position of the moving object, and the display unit may further display an image which is changed in accordance with the stored passage number of the moving object.

In a real-world car race, the road becomes blackened as a vehicle passes on the road and leaves the rubber of the tire stuck on the road. Thus, the update unit continuously updates the passage number of the moving object and stores the updated passage number in the storage unit, and the display unit displays the changes caused by the updating. Typically, the way how the road looks when seen from the driver's seat of the vehicle is changed, and the road surfaces through which the moving object has passed during the course rounds so far are gradually blackened. Typically, a plurality of textures are prepared beforehand in accordance with the passage number, the change in the road condition is expressed by attaching the textures on the road. According to the present invention, it is possible to realize a game apparatus which presents the condition of operation on the moving object and a history of movement to the player, by displaying an image showing the passage number representing the number of times the moving object moved by the player's operation passes through a certain position on the road.

In the game apparatus according to the present invention, the calculation unit may calculate the acceleration of the moving object by obtaining a frictional force given to the moving object in accordance with the stored "passage number of the moving object at a current position on the road". Particularly, the calculation unit may calculate the acceleration of the moving object in a manner that the acceleration increases as the stored "passage number of the moving object at the current position on the road" increases.

In a real-world car race, a tendency is observed that as more and more rubber of the tire sticks to the road, the gripping characteristic is improved and the frictional force between the tire and the road becomes larger, making the road unslippery. That is, the gripping characteristic is changed in accordance with the number of times a vehicle passes through on the road. Hence, the passage number of the moving object is used as the road condition and the calculation of the acceleration of the moving object is performed in a manner that as the passage number increases, the acceleration is changed, typically increased, even if the other conditions are unchanged.

According to the present invention, it is possible to realize a game apparatus which can easily simulate a tendency in a real-world car race that as a vehicle keeps running and more and more rubber of the tire sticks to the road, the gripping characteristic changes and the frictional force between the tire and the road increases to make the road unslippery, by storing the passage number of the moving object as statistics.

In the game apparatus according to the present invention, the storage unit may further store an objective route within the road, the update unit may update the stored objective route in accordance with the stored passage number of the moving object, and the display unit may further display the stored objective route.

In a real-world car race, the racers are interested in which route within the road should be taken to move faster, that is, what line selection should be made to win the race. It is assumed that the line that allows the fastest move is referred to as "record line". A record line within a clean road is a line within the course through which a player can move the vehicle by handing the steering wheel smoothly and without decelerating the vehicle as much as possible. The storage unit stores such an initial record line.

When the passage number is updated along with the move of the moving object, the record line stored in the storage unit is shifted in consideration of the change in the passage number. Typically, the record line is drawn on the road surface which can be seen from the driver's seat of the vehicle.

According to the present invention, it is possible to realize a game apparatus which presents a line selection that should be referred to by the player for moving the vehicle in a racing game, and prompts improvement in the player's skill.

A game method according to another aspect of the present invention moves a moving object on a road in a virtual world, comprises an input receiving step, a calculating step, and an updating step, and uses a storage unit for storing a condition of the moving object (including a position of the moving object) and a road condition of the road. The game method is structured as follows.

In the input receiving step, an operational input from a player is received.

In the calculating step, an influence received by the moving object is calculated based on the received operational input from the player, a stored current position of the moving object, and the road condition at the current position.

In the updating step, the stored condition of the moving object is updated in accordance with the calculated influence, and the stored road condition is updated in accordance with a change in the condition of the moving object.

A program according to a yet another aspect of the present invention is for controlling a computer to function as the above-described game apparatus or for controlling the computer to execute the above-described game method.

The program according to the present invention may be recorded on a computer-readable information recording medium such as a compact disk, a flexible disk, a hard disk, a magneto-optical disk, a digital video disk, a magnetic tape, a semiconductor memory, etc. This program may be distributed or sold through a computer communication network, separately from a computer by which the program is executed. The information recording medium may be distributed or sold separately from the computer.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

An embodiment of the present invention will be explained below.

An embodiment where the present invention is applied to an information processing apparatus for games only will be explained for easier understanding. However, the present invention can likewise be applied to various computers and information processing apparatuses such as PDAs (Personal Data Assistants), cellular phones, etc. That is, the embodiment to be described below is intended for illustration and not intended for limiting the scope of the present invention. Accordingly, even if a person with ordinary skill in the art can employ an embodiment where all or some of the elements of the embodiment to be described below are replaced with equivalents of those, such an embodiment will be regarded to be included in the scope of the resent invention.

The Embodiment of the Invention

Figure 1:
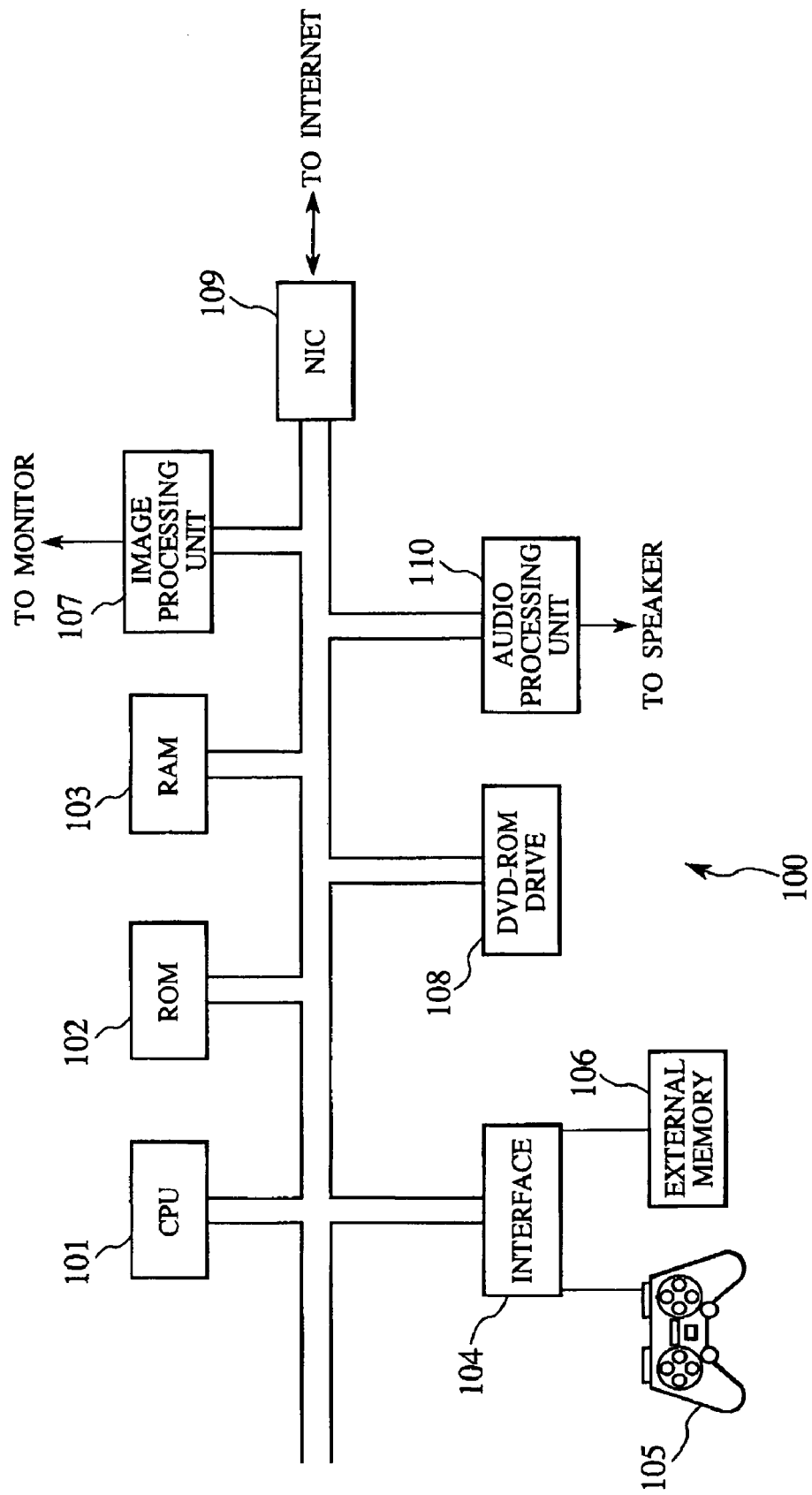
FIG. 1 is an exemplary diagram showing schematic structure of a typical information processing apparatus by which a game apparatus according to an embodiment of the present invention is realized.

FIG. 1 is an exemplary diagram showing a schematic structure of a typical information processing apparatus by which a game apparatus according to one embodiment of the present invention is realized. The following explanation will be made with reference to FIG. 1.

An information processing apparatus 100 comprises a CPU (Central Processing Unit) 101, a ROM (Read Only Memory) 102, a RAM (Random Access Memory)) 103, an interface 104, a controller 105, an external memory 106, an image processing unit 107, a DVD (Digital Versatile Disk)-ROM drive 108, an NIC (Network Interface Card) 109, and an audio processing unit 110.

The game apparatus according to the present embodiment is realized by installing a DVD-ROM storing a program and data for a game on the DVD-ROM drive 108 and switching on the information processing apparatus 100 to execute the program.

The CPU 101 controls the entire operation of the information processing apparatus 100, and is connected to each component and transmits control signals and data therewith. The CPU 101 receives data from each component, processes the received data by various calculations and supplies the processed data to each component as data or control signals. In the CPU 101, various data are once stored in a cache of the CPU 101 and then acquired by a register of the CPU 101, and thereafter applied various calculations such as four arithmetic calculations, bit calculations, logic calculations, etc.

In the ROM 102, an IPL (Initial Program Loader) to be executed immediately after the power is on is stored, execution of which causes the program stored in the DVD-ROM to be read into the RAM 103 and executed by the CPU 101. In the ROM 102, a program and various data for an operating system necessary for controlling the entire operation of the information processing apparatus 100 are also stored.

The RAM 103 is for temporarily storing data and programs. A program and data read from the DVD-ROM and other data necessary for progression of the game or communications are stored in the RAM 103. Other than these, various information transmitted from devices connected to the information processing apparatus 100 and information to be transmitted to the devices are temporarily stored in the RAM 103.

The controller connected via the interface 104 receives operational inputs entered by a user when playing a game. The external memory 106 rewritably stores data representing progress statuses of a game, etc. The user can record these data on the external memory 106 when it is necessary to record the data, by entering an instruction via the controller 105.

A DVD-ROM to be installed on the DVD-ROM drive 108 stores a program for realizing a game, and image data and audio data accompanying the game. The DVD-ROM drive 108 executes a read process towards the DVD-ROM installed thereon under the control of the CPU 101 to read a necessary program and necessary data. The read program and data are temporarily stored in the RAM 103 or the like.

The image processing unit 107 processes the data read from the DVD-ROM by an image calculation processor (not shown) comprised in the CPU 101 or the image processing unit 107, and stores the processed data in a frame memory (not shown) comprised in the image processing unit 107. The image information stored in the frame memory is converted in to a video signal at a predetermined synchronization timing and output to a monitor (not shown) connected to the image processing unit 107. Due to this, image display in various manners is available.

The image calculation processor can perform a calculation for superposing a two-dimensional image, a transparency calculation such as α blending, and various saturation calculations at a high speed. Further, the image calculation processor can perform at a high speed, a calculation for rendering by a Z-buffering method, polygon information which is arranged in a virtual three-dimensional space and to which various texture information pieces are attached to obtain a rendering image in which the polygon arranged in the virtual three-dimensional space is overlooked from a predetermined viewing position. Particularly, the image calculation processor has as a library or hardware of a function for calculating the degree to which the polygon is irradiated by a typical (positive) light source such as a dot light source, a parallel light source, a conic light source, etc., and can therefore perform such a calculation at a high speed.

Further, by cooperation of the CPU 101 and the image calculation processor, a letter string can be depicted in the frame memory or on a polygon surface as a two-dimensional image in accordance with font information defining the shape of letters. The font information is stored in the ROM 102. However, dedicated font information stored in the DVD-ROM may also be used.

The NIC 109 is for connecting the information processing apparatus 100 to a computer communication network (not shown) such as the Internet, etc. The NIC 109 is constituted by a modem meeting the 10BASE-T/100BASE-T standard used for building a LAN (Local Area Network), or an analog modem, ISDN (Integrated Services Digital Network) modem, and ADSL (Asymmetric Digital Subscriber Line) modem for connecting to the Internet using a telephone line, or a cable mode for connecting to the Internet using a cable television line, or the like and an interface (not shown) for intermediating between the modem and the CPU 101.

The audio processing unit 110 converts audio data read from the DVD-ROM into an analog audio signal, and causes the analog audio signal to be output from a speaker (not shown) connected to the audio processing unit 110. Further, under the control of the CPU 101, the audio processing unit 110 generates sound effects and music data that should be sounded during the progress of the game, and causes audios corresponding to the sound effects and music data to be output from the speaker. Sound effects and music data include, for example, a running noise of a vehicle, a vibration sound, a noise caused when a tire is locked, an abnormal noise caused when a gearlever is shifted to an unmatched gear rate, a sound caused when the clutch is let in, etc.

The information processing apparatus 100 may use a large capacity external storage device to allow the large capacity external storage device to perform the functions of the ROM 102, the RAM 103, the external memory 106, the DVD-ROM installed on the DVD-ROM drive 108, etc.

Schematic Structure of the Game Apparatus

Figure 2:
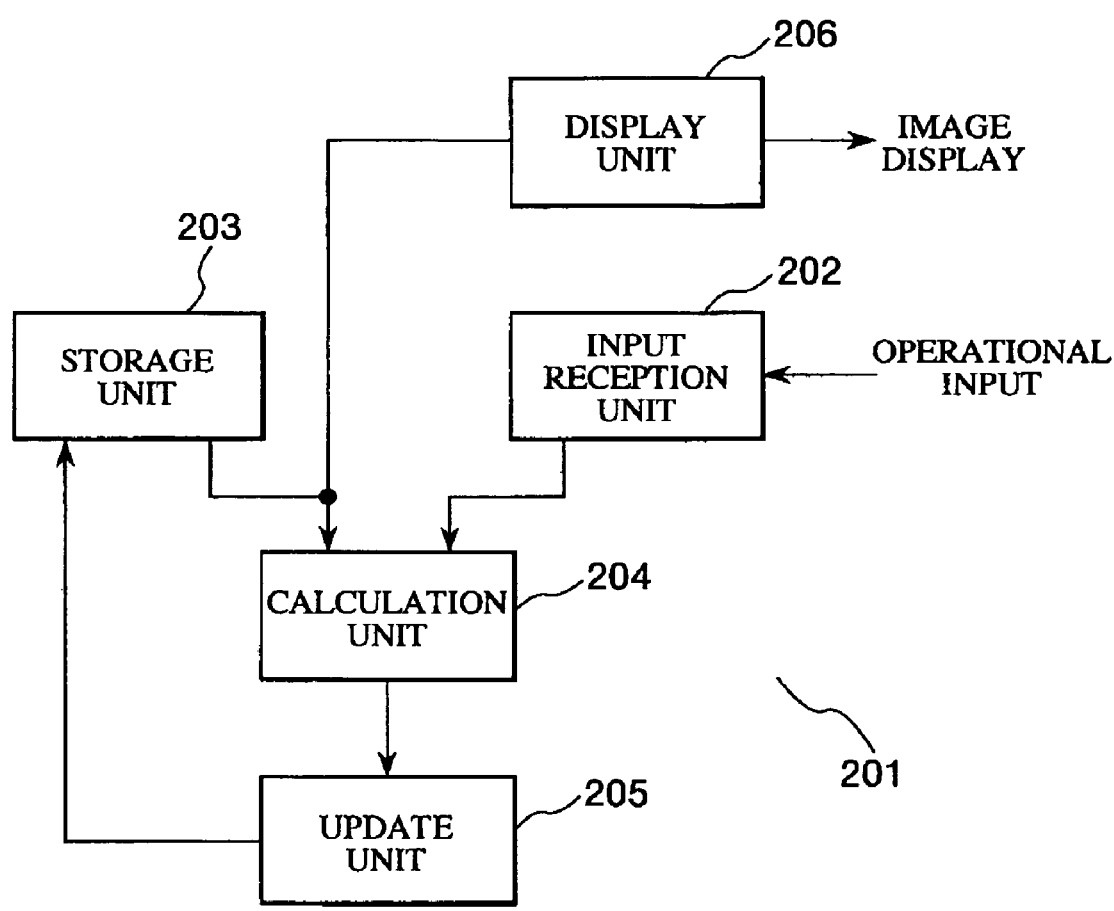
FIG. 2 is an exemplary diagram showing a schematic structure of a game apparatus according to the embodiment of the present invention.
Figure 3:
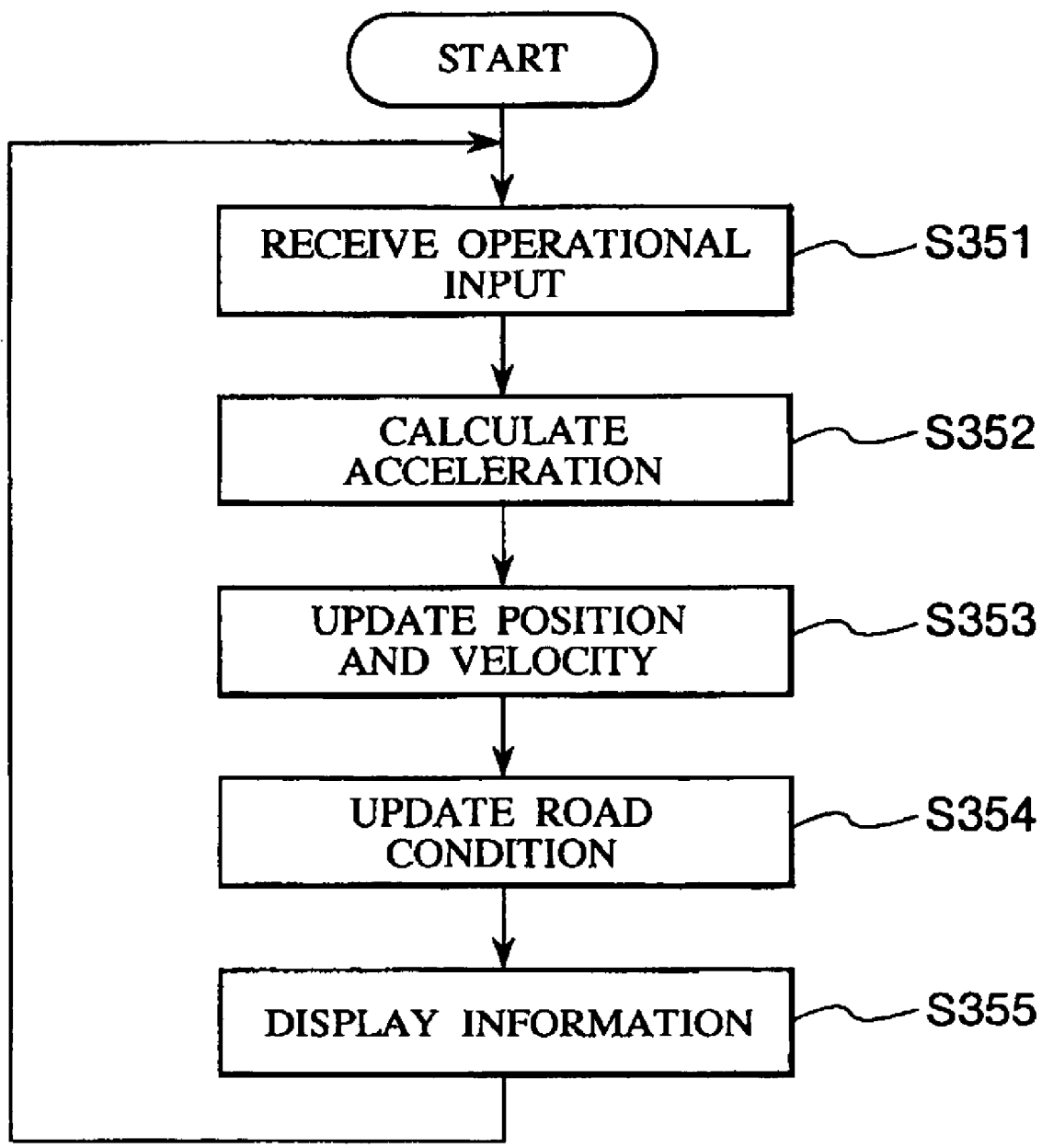
FIG. 3 is a flowchart showing a flow of processes of a game method executed by the game apparatus according to the embodiment of the present invention.

FIG. 2 is an explanatory diagram showing the schematic structure of each function of the game apparatus according to the present embodiment. FIG. 3 is a flowchart showing the flow of the processes of a game method executed by the game apparatus according to the present embodiment. The following explanation will be made with reference to FIG. 2 and FIG. 3.

A game apparatus 201 according to the present embodiment comprises an input reception unit 202, a storage unit 203, a calculation unit 204, an update unit 205, and a display unit 206.

The storage unit 203 stores a position and velocity of a moving object, and a condition of a road. According to the present embodiment, as a road condition, the storage unit 203 stores a number of times the moving object passes through a predetermined position of the road. Accordingly, the RAM 103 functions as the storage unit 203.

As will be described later, information regarding the position and velocity of the moving object and road condition stored in the storage unit 203 is updated as the process flow advances. In a case where the moving object is a vehicle, the storage unit 203 stores various other information, such as the weight of the vehicle, the posture of the steering wheel, the type and wear amount of the tires, the rotation number, temperature, and output of the engine, the current position of the gearlever, the gear rate, the position of the clutch, etc. The storage unit 203 may store the type of the road (whether the road is composed of asphalt, gravel, dirt, or tarmac, whether it is raining, whether the moving object is on the course or off the course, whether the moving object is on grass when it is off the course), etc. as the road condition.

Also numerical value information such as the coordinates of the vertices for defining the shape of the road or, as will be described later, the shapes of figures used for dividing the road to manage various information and the coordinates of control points of a curved line is read from the DVD-ROM and stored in the RAM 103.

Figure 4:
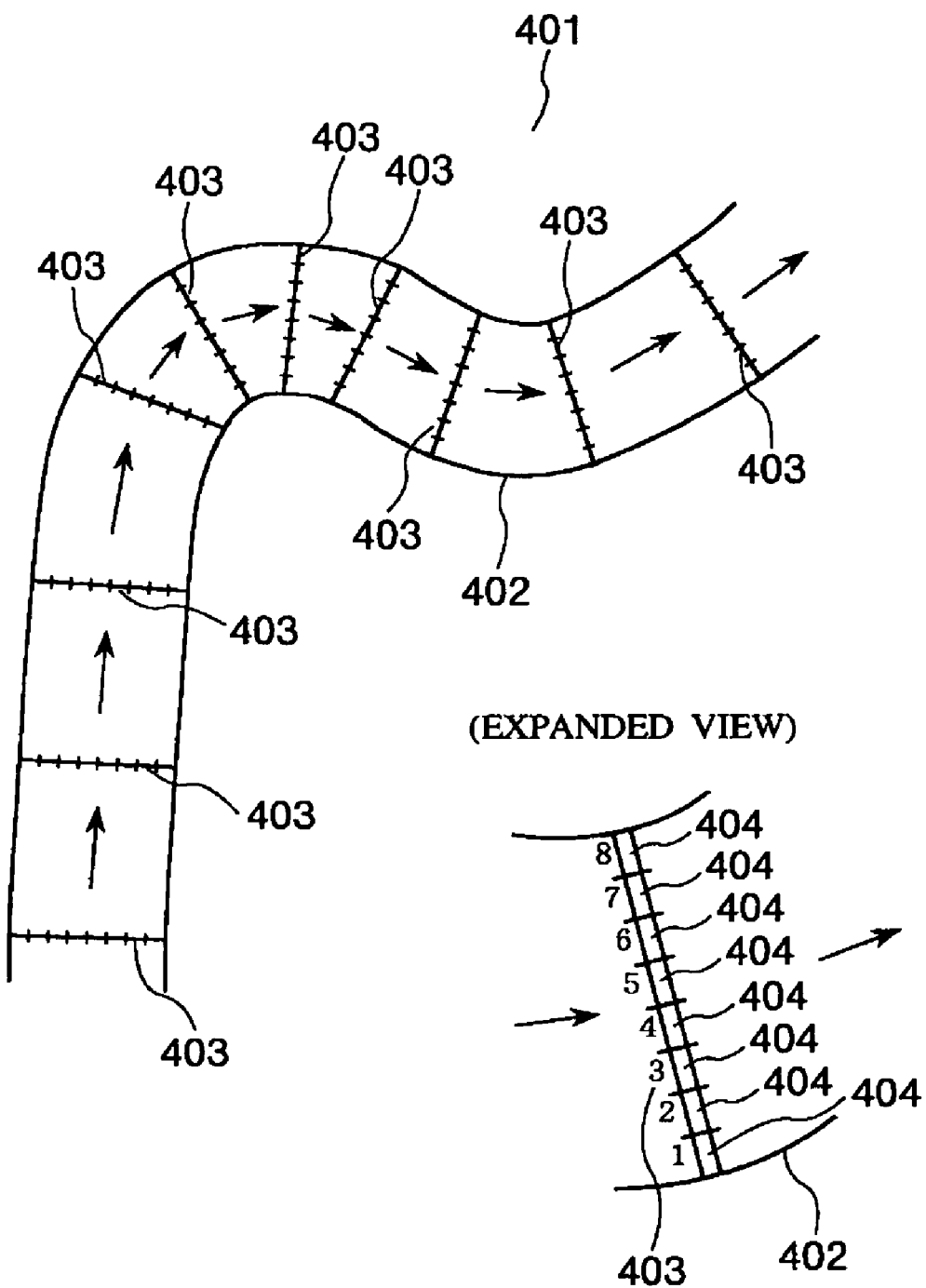
FIG. 4 is an explanatory diagram showing positions on a road for which passage numbers are recorded.
Figure 5:
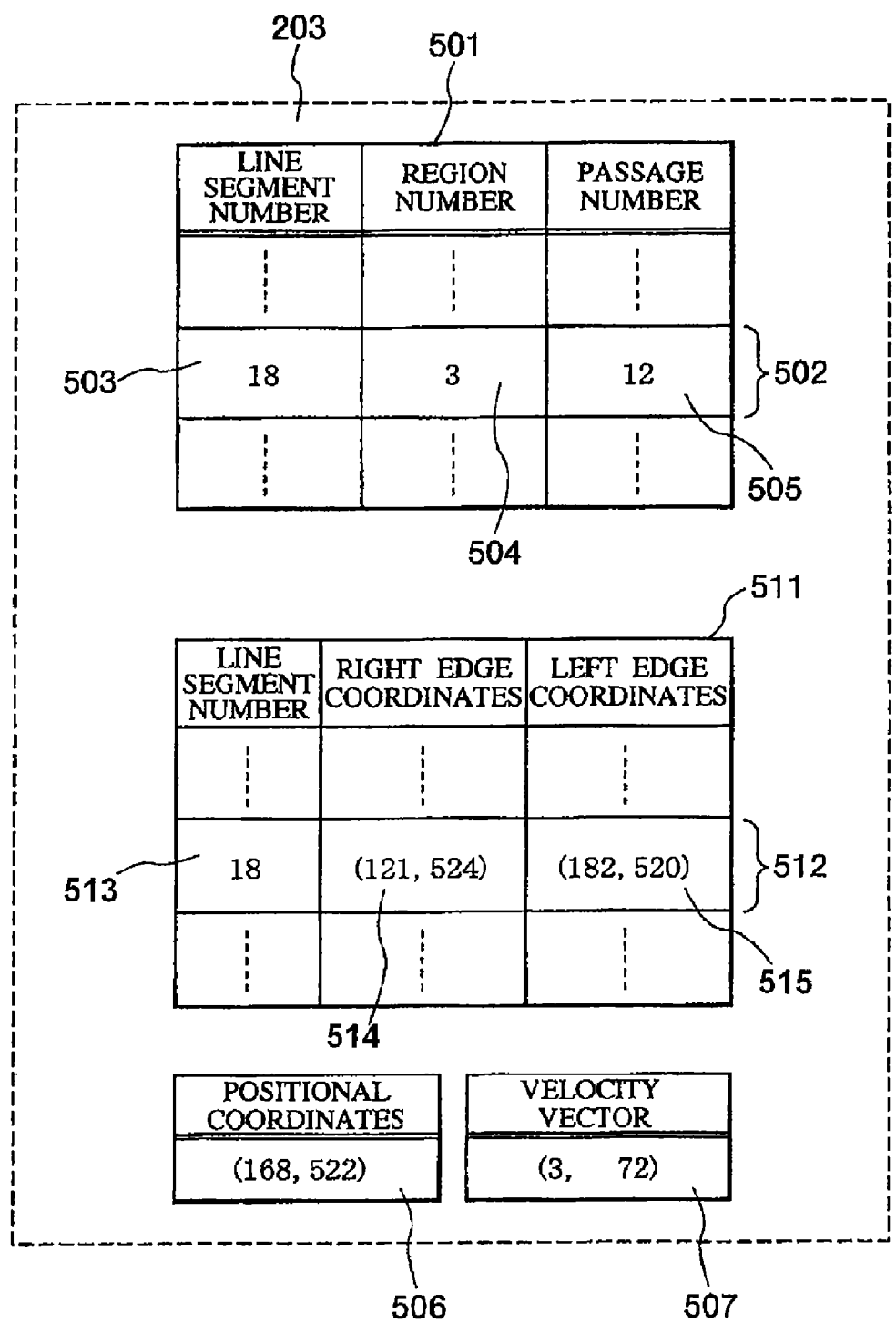
FIG. 5 is an explanatory diagram showing information stored in a storage unit.

FIG. 4 is an explanatory diagram showing an example of positions on the road, the number of times of passages through which is recorded. FIG. 5 is an explanatory diagram showing various pieces of information stored in the storage unit 203. The following explanation will be made with reference to FIG. 4 and FIG. 5.

The range in which the friction between the tires and the road becomes an obstacle is a road surface 402 in a road 401. Thus, line segments 403 extending from the edge to edge of the road surface 402 substantially vertically to the progressing direction of the road surface 402 are provided densely at the place where the curvature of the road surface 402 is high (the curve is tight) and provided coarsely at the place where the curvature is low. Note that the line segments 403 may be arranged in any way, as long as they do not cross each other.

A region will be considered which is obtained by dividing each line segment 403 at each predetermined interval. In the example shown in FIG. 4, since the width of the road surface 402 is fixed, each line segment 403 is divided into eight regions 404 having the same length. The number of segmenting the line segment 403 may be changed in accordance with the capacity of the RAM 103, etc.

Each line segment 403 is assigned an identification number (line segment number) that is not overlap with others. Further, each region is assigned an identification umber (region number) that is not overlap with others within the same line segment 403. According to the present embodiment, the line segment numbers are assigned as 1, 2, 3, ... from the start line (not shown) in the general progressing direction of the road. The region numbers are assigned as 1, 2, 3, ... from the right edge to the left edge of the road with respect to the general progressing direction of the road.

Records 502 in a passage number table 501 shown in FIG. 5 and stored in the storage unit 203 are associated in one to one correspondence with the regions 404 of each line segment 403. A line segment number 503, a region number 504, and a passage number 505 indicating the number of times a concerned region 404 has been passed through since the start of the game, are recorded in the passage number table 501.

The storage unit 203 further stores coordinates 506 of the current position of the vehicle and a current velocity vector 507 of the vehicle.

Other than these, the storage unit 203 also stores a line segment coordinate table 511 storing coordinate data of each line segment 403 within the road 401. Records in the line segment coordinate table 511 are associated in one to one correspondence with the line segments 403 set within the road surface 402 of the road 401. A line segment number 513, coordinates 514 of the right edge and coordinates 515 of the left edge are recorded.

The input reception unit 202 receives an operational input from the player (step S351). The operational input is given not only to the controller 105 which is attached to the game apparatus 100 as a standard equipment, but also to a steering-wheel-shaped controller, a brake-shaped controller, a gear-lever-shaped controller, etc. Accordingly, these various controllers function as the input reception unit 202.

The calculation unit 204 calculates the acceleration of the moving object based on the received operational input from the player, the current position of the moving object which is stored, and the road condition of the stored current position (step S352). It is necessary to derive the contact surface of the tire and the frictional force between the tire and the road in order to calculate the acceleration in a case where a vehicle runs on a road. Thus, the road condition of the current position of the moving object is checked, and the acceleration of the vehicle is determined based on the road condition, other information stored in the above-described manner, and the operation of the player.

As to the influences given by the player's operation to each parameter of the vehicle, various techniques such as publicly known techniques for a racing game can be utilized. Therefore, a method of calculating the acceleration of the moving object by using the passage number table 501 will be explained below in detail.

Figure 6:
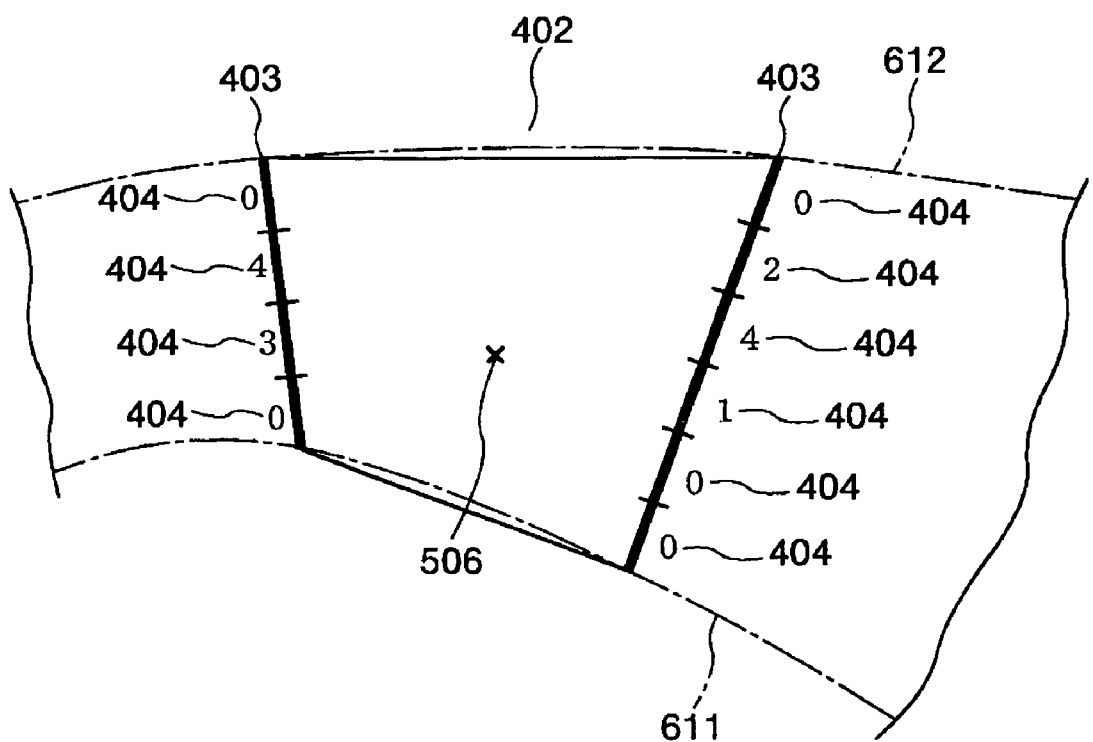
FIG. 6 is an explanatory diagram showing a relationship between a position of a moving object and line segments.

First, the calculation unit 204 checks between which line segments 403 the moving object is currently sandwiched based on the current position 506 of the moving object stored in the storage unit 203 and the line segment coordinate table 511. FIG. 6 is an explanatory diagram showing a positional relationship between the line segments 403 which are obtained by the checking and the moving object. FIG. 6 corresponds to a part of the road surface 402 shown in FIG. 4. It is assumed that the moving object moves from the left to the right of the road surface 402. The two line segments 403 shown in FIG. 6 are lines crossing the road surface 402 on which the vehicle moves, that is, lines connecting a right edge 611 and a left edge 612 of the road surface 402. For easier understanding, the right edge 611 and the left edge 612 are indicated by a chain line. The width of the road surface 402 (the length of the line segment 403) greatly changes in a part of the road surface 402 in FIG. 6. This is also intended for easier understanding, and generally the road surface 402 is kept to almost the same width. As shown in FIG. 6, the calculation unit 204 checks which are the two line segments 403 that sandwich the moving object 601, by scanning the line segment coordinate table 511.

Since the line segments 403 do not cross each other as described above, the two line segments 403 can be obtained by scanning the line segment coordinate table 511 from its top to obtain the right edge coordinates 514 and left edge coordinates 515 of a given line segment and a line segment next to it, and by checking whether the position 506 of the moving object is included in a quadrilateral whose vertices are arranged at the obtained four coordinates.

Since the line segment coordinate table 511 is sorted in the order of the line segment numbers and the line segment numbers are assigned so as to increment from the number assigned to the start line, a pair of line segments 403 that form a desired quadrilateral can be obtained fast if the scanning is started from the pair of line segments 403 that is found out in the last scanning.

Next, the passage number of each region 404 included in the obtained line segments 403 is obtained from the passage number table 501. In FIG. 6, the passage numbers "0", "4", "3", and "0", and "0", "2", "4", "1", "0", and "0" are indicated near the respective regions 404. The passage number at the position 506 of the moving object is interpolatively estimated based on these passage numbers. A publicly known technique or various other techniques can be utilized as the method of interpolative estimation. However, according to the present embodiment, interpolation will be carried out in a manner described below.

Figure 7:
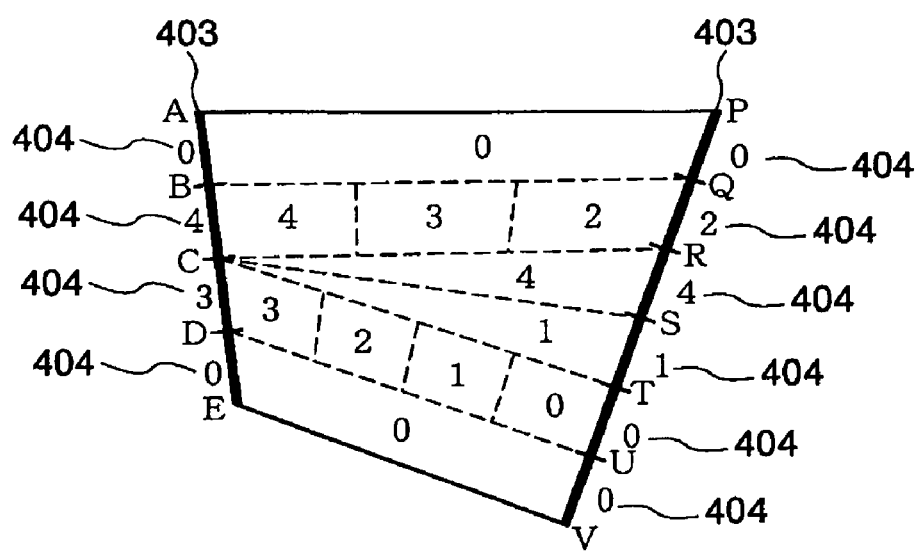
FIG. 7 is an explanatory diagram for explaining a manner for obtaining a passage number.

The regions 404 of the two line segments 403 are connected to each other sequentially from the edges as shown in FIG. 7 (as indicated by dot lines). In the example shown in FIG. 7, since the two line segments 403 have different numbers of regions 404 from each other, a quadrilateral is drawn by connecting the regions 404 facing each other at the right edge and at the left edge respectively, but a portion having a triangular shape is arranged in the center of the quadrilateral due to that some regions 404 do not have their facing regions 404.

In a case where the number of end points of one of the two sandwiching line segments and the number of end points of the other of the two sandwiching line segments are different as shown in FIG. 7, the end points facing each other are connected sequentially from both the edges of the sandwiching line segments. Then, once the central end point of one line segment is reached, this central end point is seen as the connection partner for the unconnected end points of the other line segment.

In FIG. 7, one of the sandwiching line segments (on the left) is divided into four line segment regions and the other of the sandwiching line segments (on the right) is divided into six line segment regions. Here, it is assumed that the end points of the line segment regions of the one line segment are A, B, C, D, and E sequentially from the top, and the end points of the line segment regions of the other line segment are P, Q, R, S, T, U, and V sequentially from the top.

Because the end points are connected sequentially from both the edges of the sandwiching line segments, A-P and E-V are connected first.

Next, B-Q and D-U are connected.

Then, C-R and C-T are connected. This is because the end point C which is arranged in the center is reached and C is therefore used as the end point to be connected thereafter.

Lastly, C-S are connected.

As a result, quadrilateral areas (dot line quadrilaterals) ABQP, BCRQ, CDUT, and DEVU, and triangular areas (dot line triangles) CSR and CTS are formed.

Then, the calculation unit 204 checks in which dot line quadrilateral or dot line triangle the position 506 of the moving object is included. In a case where the position 506 of the moving object is included in a dot line triangle, the calculation unit 204 regards the passage number of the region 404 that constitutes the side of the dot line triangle as the passage number of the position 506.

In a case where the position 506 of the moving object is included in a dot line quadrilateral and the passage numbers of the facing regions 404 are the same, the calculation unit 204 regards the passage numbers as the passage number of the position 506.

In a case where the passage numbers of the facing regions 404 are not the same, each dot line is divided into equal parts by a "number obtained by adding one to the difference between the passage numbers" of the facing regions 404, the facing division points are connected to each other (as shown by broken lines), and passage numbers are assigned to sections (the respective portions enclosed by any of the line segments 403, the lines connecting the end points of the line segments 403, and the broken lines) in such a manner that the assigned passage numbers are changed one by one from one region 404 towards the other region 404. The calculation unit 204 determines the passage number of the position 506 of the moving object in accordance with in which section the position 506 is included. In FIG. 7, passage numbers are indicated for the respective sections.

If the passage number can be obtained in this manner, the degree of gripping can be obtained in accordance with various parameters defined in the game and the acceleration of the vehicle can be calculated by using a publicly known simulation calculation technique or various other techniques. In this case, it is preferred that the frictional force is set to be larger as the passage number is greater, if the other conditions are the same. A tendency is observed in a real car race that as the rubber sticks to the road more, the gripping characteristic is improved and the frictional force between the tires and the road becomes larger, making the vehicle harder to slip. The above-described preferred setting is for matching the game with this tendency.

The update unit 205 updates the stored position and velocity of the moving object in accordance with the calculated acceleration (step S353). The update unit 205 obtains the velocity by integrating the calculated acceleration and obtains the position by integrating the velocity.

If update is performed at each vertical synchronization (every 1/60 second), the update unit 205 calculates the increment of the velocity by multiplying the acceleration by the time interval, and calculates the increment of the position by multiplying the average of the current velocity and "the velocity obtained by adding the increment to the current velocity" by the time interval. The update unit 205 performs update by adding the calculated increments to the coordinates 506 of the position of the moving object and the velocity vector 507 of the moving object which are stored in the storage unit 203.

Then, the update unit 205 updates the stored road condition in accordance with a change in at least one of the position, velocity and acceleration of the moving object (step S354). In a case where the degree of the peeling of the rubber varies in accordance with the velocity and acceleration of the vehicle, it is possible to employ an embodiment in which the road condition is updated in consideration of the velocity and acceleration. However, according to the present embodiment, the road condition is updated in accordance with the change in the position of the moving object.

Figure 8:
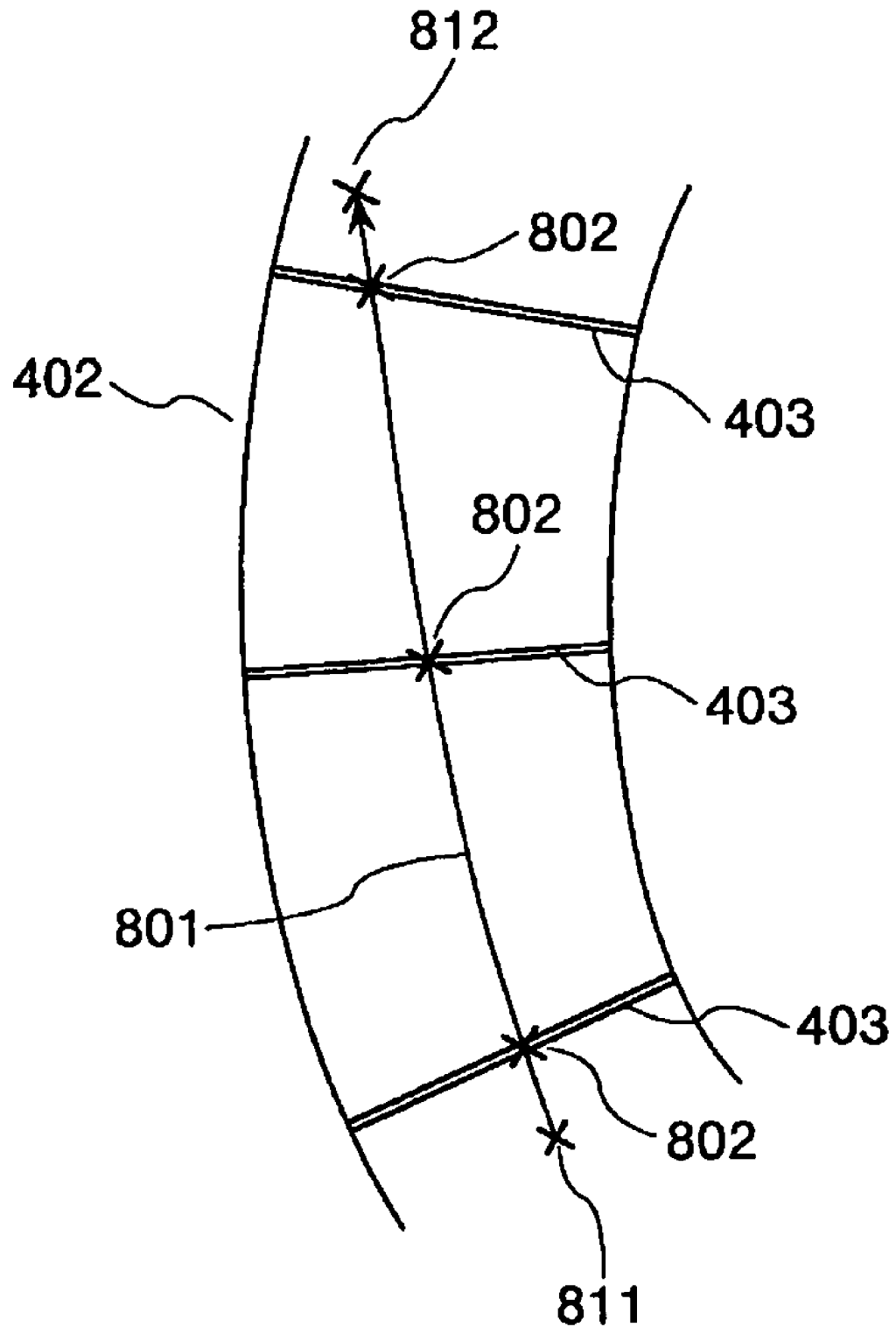
FIG. 8 is an explanatory diagram for explaining a manner for updating a passage number.

As shown in FIG. 8, consideration is given to a displacement 801 which connects coordinates 811 of the moving object before update in step S353 and coordinates 812 of the moving object after update. Intersections 802 of the displacement 801 and the respective line segments 403 are obtained. It is possible to determine whether or not the respective line segments 402 intersect with the displacement 801 by using a publicly known technique for obtaining an intersection of a line segment and a line segment, if the coordinates of both the edges of the respective line segments 403 are obtained by scanning the line segment coordinate table 511.

Further, by dividing the distance between the obtained intersection and the right edge of the line segment 403 by the length for diving the line segment 403 to obtain the regions 404, a region number 504 of the region in which the intersection 802 is included can be obtained. Then, the passage number 505 in the record 502 corresponding to the region 404 of each line segment 403 that is determined as intersecting with the displacement 801 is increased by one.

The display unit 206 displays at least one of the stored position and velocity of the moving object (step S355), and the flow returns to step S351. If update is performed at each vertical synchronization as described above, the CPU 101 waits for each vertical synchronization on an appropriate occasion in the repetition of step S351 to step S355.

Figure 9:
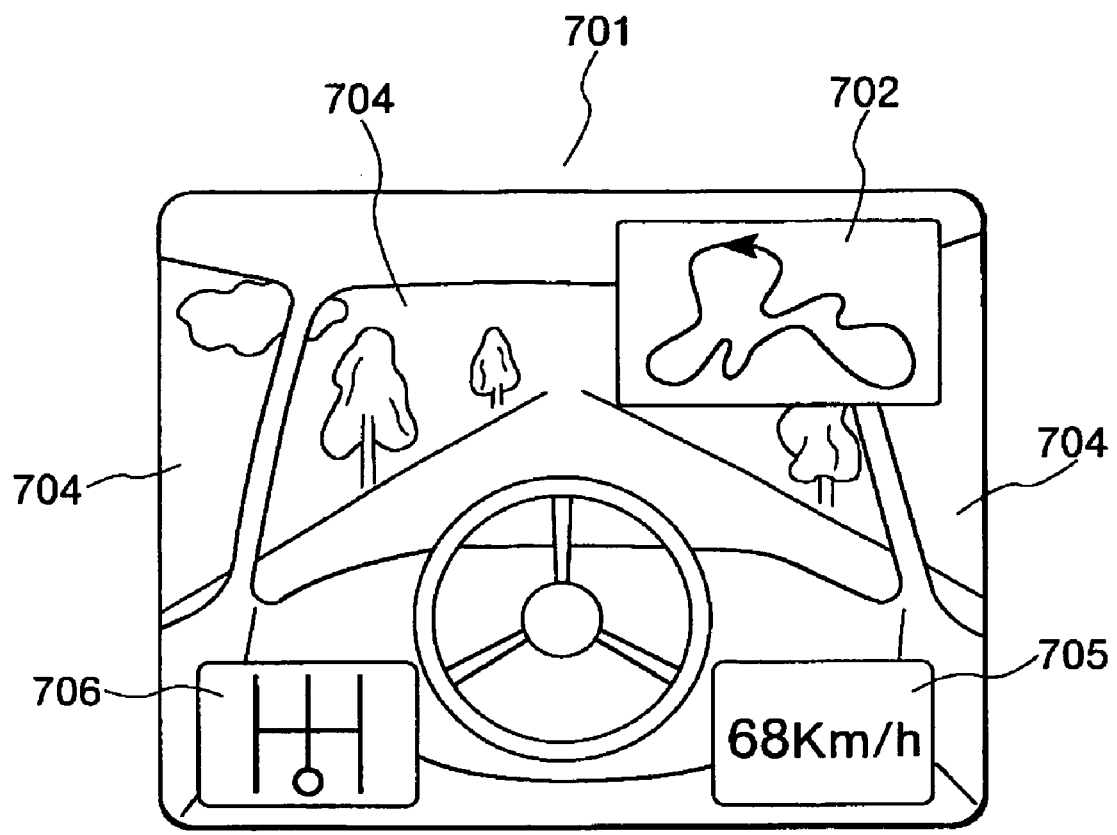
FIG. 9 is an explanatory diagram showing an example of display on a screen by the present game apparatus.

FIG. 9 shows a display example of a racing game. As shown in FIG. 9, on a screen 701, a course display area 702 showing the position and direction of the vehicle in the course, an external world display area 704 showing how the external world appears when seen from the driver's seat of the vehicle, a velocity display area 705, and a gearlever display area 706 are prepared, and various information are displayed.

Though not clearly shown in FIG. 9 for fear of making the diagram complicated, information representing the passage number is assigned to each section of the road as shown in FIG. 7. Accordingly, texture information which is pre-associated with the passage number is attached to the road and is displayed by three-dimensional graphics. Due to this, the place whose passage number is large can be displayed such that the color of the rubber is darker as much.

As described above, according to the present embodiment, a moving object is moved on a road in a virtual world, the influence received by the moving object from the road is changed based on the history of movement, and the acceleration of the moving object is changed in accordance with this influence. Particularly, by displaying an image representing the number of passages through the road by the moving object moved by the player's operation, the history of operation or movement of the moving object is presented to the player. Further, it is possible to easily simulate a tendency in a real car race that as the car runs and the rubber sticks to the road, the gripping characteristic is improved, the frictional force between the tires and the road becomes large and the road becomes unslippery, by storing the passage number of the moving object as statistics.

Other Embodiments

If a record line showing a desired line selection in a car race is displayed on the screen, it is possible to present a line selection that the player should consider as the reference for moving the vehicle and to prompt improvement in the player's driving skill. The present embodiment is for displaying such a record line.

Figure 10:
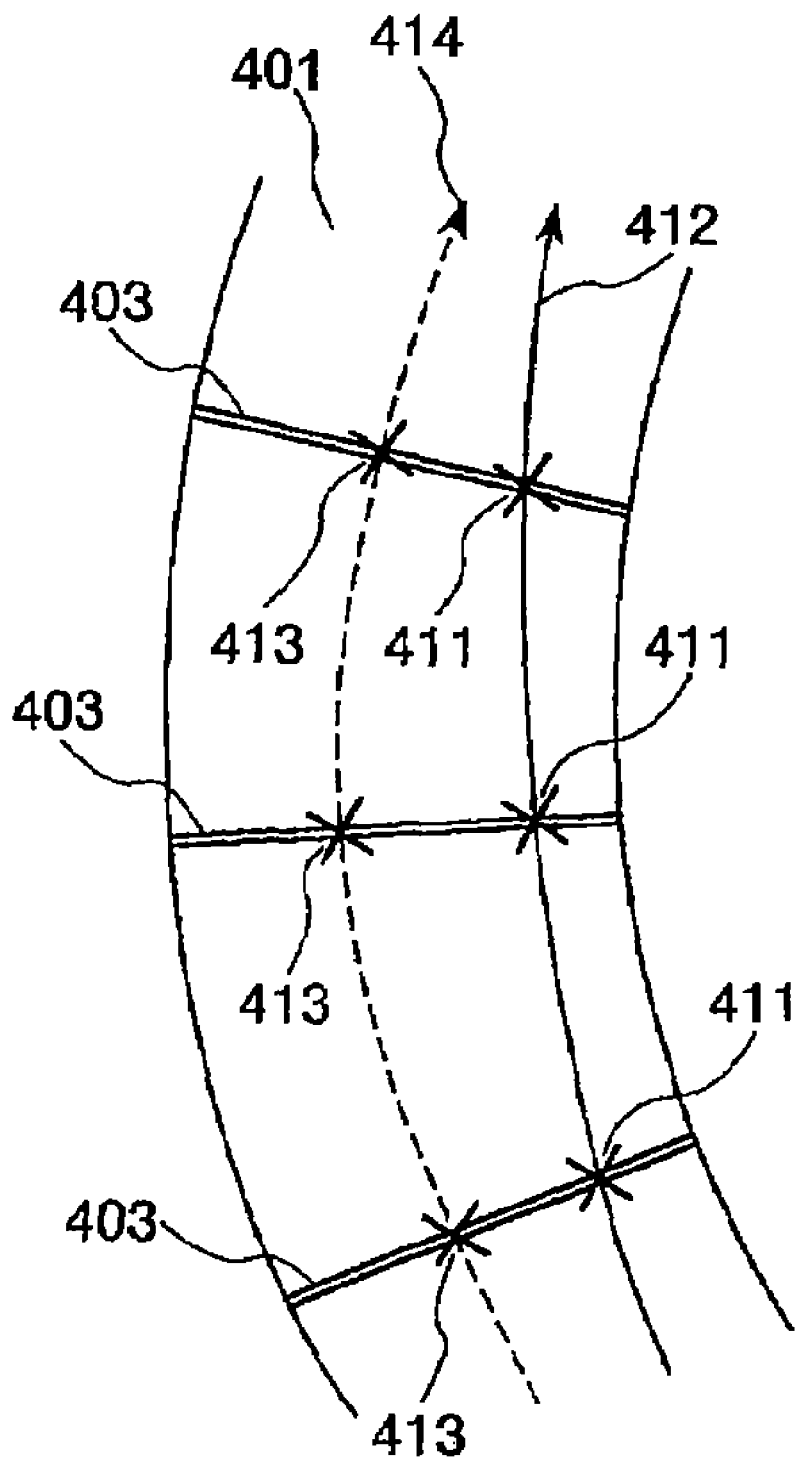
FIG. 10 is an explanatory diagram for explaining a manner for obtaining a record line.

FIG. 10 is an explanatory diagram showing a manner for updating a record line. The following explanation will be made with reference to FIG. 10

As shown in FIG. 10, an initial point 411 that should be passed through by an initial record line 412 is assigned to each line segment 403 of the road 401. The record line at the beginning of the game is a curved line which passes through these initial points 411 (a curved line obtained by various interpolation techniques such as spline interpolation, etc.). Each line segment 403 is divided into a plurality of regions 404 (not shown in FIG. 10 for easier understanding) likewise the above-described embodiment. The passage number of each region 404 is stored in the storage unit 203.

Coordinates obtained for each line segment 403 by calculating a weighted average to be described below are regarded as the coordinates of the passing point of a new record line.

(1) The passage number of a region 404 is used as the weight of the coordinates of a representative point in the region 404. The center point of the region 404 is regarded as the representative point.

(2) A predetermined constant is used as the weight of the coordinates of the initial point 411. Different constants are used in accordance with the types of the road and the type of the tire to be used.

When the coordinates of the new passing points of the respective line segments 403 are obtained, a curved line which passes through these passing points is formed as a new record line by the same interpolation technique. FIG. 10 shows the passing points 413 and shows the new record line 414 which passes through these passing points 413 by a dot line.

Figure 11:
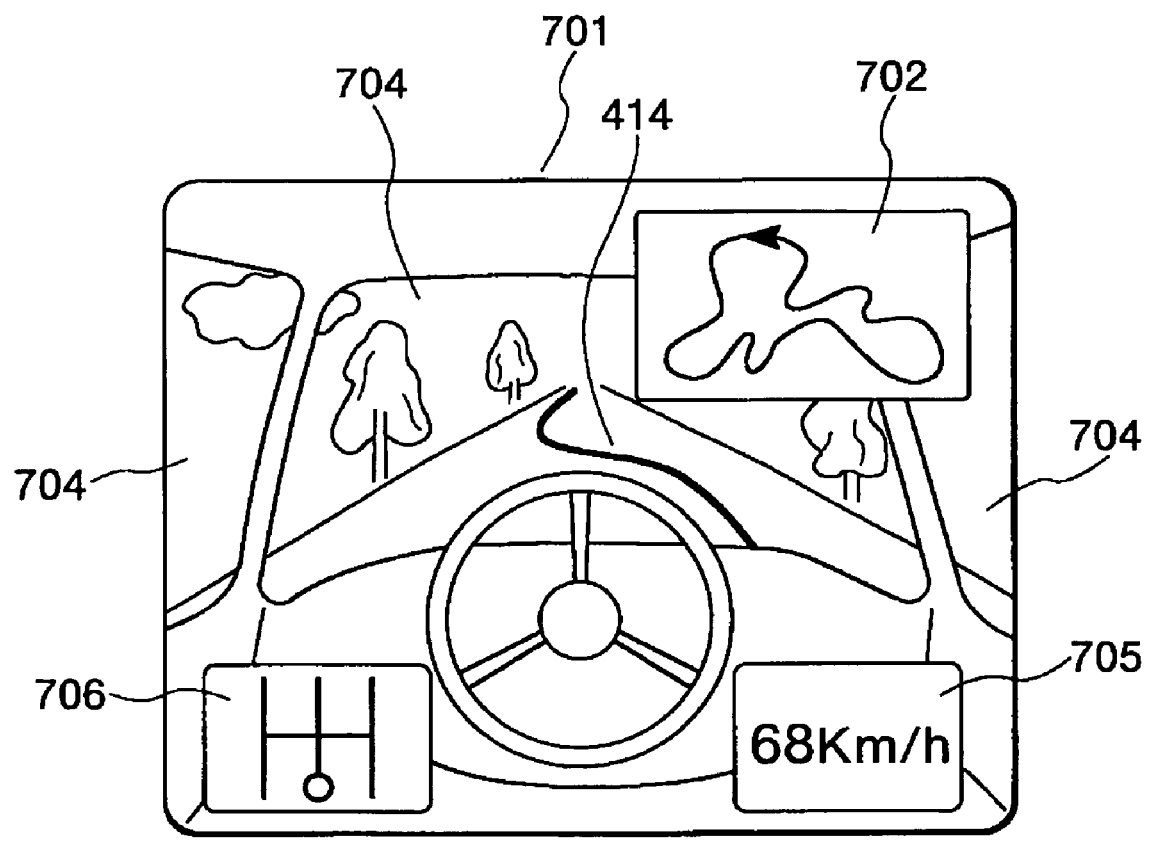
FIG. 11 is an explanatory diagram showing an example of display on a screen by the present game apparatus.

FIG. 11 is an exemplary diagram showing how the thusly obtained record line 414 is displayed on the screen. The record line 414 is displayed by three-dimensional graphics on the road in the external world seen from the driver's seat in the vehicle. The player can improve his/her steering skill by following the displayed record line as an objective.

A realer racing game can be realized by the following manner, other than the above-described embodiment.

The following information pieces are stored for each position on the road as the road condition.

Reference frictional force

Passage number

Other road conditions

And the following information pieces appropriately selected and the selected information pieces are taken into account for calculating the acceleration of the vehicle.

Reference frictional force at the current position

Passage number of the current position

Other road conditions

Current position of the vehicle

Current velocity of the vehicle

Current acceleration of the vehicle

Other vehicle conditions (the weight of the vehicle, the condition of the tires, the condition of the engine, etc.)

Though in the real world, the gripping characteristic changes in accordance with the passage number of the vehicle, the amount of the change gradually becomes smaller. For example, the change in the gripping characteristic of a case where a place that has been passed through a thousand times so far is passed through once more is smaller than the change in the gripping characteristic of a case where a place that has not been passed through before is passed through.

Further, in a case where a vehicle that falls out of the course returns to the course bringing grass or sand together, or in a case where a vehicle that causes oil leakage passes, the grass, the sand, or the oil are scattered over the road, making the gripping characteristic lower.

Furthermore, the amount of the rubber peeled off from the tires is changed in accordance with the weight of the vehicle or the acceleration (load) of the vehicle with respect to the road. Therefore, if a tire on which a great load is put passes, the gripping characteristic greatly changes.

Hence, in order to reflect these situations, not only the passage number is taken into consideration, but also various road conditions such as reference frictional force, etc. are stored so that the various road conditions are updated in accordance with changes in the condition of the moving object.

In the above-described embodiment, the frictional force is directly derived from the passage number. According to the present embodiment, a manner to be described below can be employed.

(a) The gripping characteristic is pre-set for each position on the road. The gripping characteristic set on the road is updated in accordance with a change in the condition of the vehicle. The passage number is not taken into consideration. Due to this, it is possible to simulate the change in the road in a simple manner.

(b) The gripping characteristic is pre-set for each position on the road. The gripping characteristic set on the road and also the passage number are updated in accordance with a change in the condition of the vehicle. Due to this, it is possible to simulate differences such as a road whose condition is easily changed, a road whose condition is not easily changed, a road whose condition is changed due to a change in the condition of a vehicle, etc.

In the above-described embodiments, the entire vehicle is seen as the "moving object". However, it is possible to employ a manner in which each concerned tire is seen as the "moving object" in case of considering interactions between the tire and the road, and the entire vehicle is seen as the "moving object" in case of considering position, velocity, acceleration, etc. Due to this, it is possible to simulate the real world in accordance with the calculation capacity of the hardware of the game apparatus.

INDUSTRIAL APPLICABILITY

As described above, it is possible to provide a game apparatus and game method for moving a moving object on a road in a virtual world, and changing an influence received by the moving object from the road based on a history of movement, and a program for realizing those on a computer.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A game apparatus for moving a moving object on a road in a virtual world, wherein line segments extend between the edges of the road and each of the line segments is divided into line segment regions, and for each neighboring pair of the line segments, the end points of the regions of the first line segment of the pair and the end points of the regions of the second line segment of the pair are connected sequentially from both the edges of the pair and the quadrilateral areas or triangular areas are formed, said game apparatus comprising:

an input reception unit which receives an operational input from a player;

a storage unit which stores a position and a velocity of the moving object and passage numbers, each of which represents a number of times the moving object passed through each of the regions;

a calculation unit which checks in which quadrilateral area or triangular area the moving object is included, estimates a passage number representing a number of times the moving object passed at the stored position of the moving object from the stored passage numbers of the one or two regions of the area including the moving object, and calculates an influence on the moving object based on the received operational input from the player, the stored position of the moving object, and the estimated passage number; and an update unit which updates the stored position and the stored velocity of the moving object in accordance with the calculated influence, and increments the passage number that was stored of the region which is intersected by a line connecting the previous position and the updated position of the moving object, and wherein, said calculation unit:
(a) estimates the passage number for each triangular area having one line segment region for which passage number L has been stored, as L; and
(b) divides each quadrilateral area bounded by two line segment regions for one of which passage number M has been stored and for the other of which passage number N (where M is less than N) has been stored so that N−M+1 number of small quadrilateral areas are arrayed in a row and one end of the row is defined by the line segment region with the stored passage number M and other end of the row is defined by the line segment region with the stored passage number N, and estimates respective passage numbers of the arrayed small quadrilateral areas, ranging from the stored passage number M to the stored passage number N, incrementing by 1, respectively in order from one small quadrilateral area at said one end of the row to another small quadrilateral area at the other end of the row.

2. The game apparatus according to claim 1, wherein:
said calculation unit calculates an acceleration of the moving object as the influence on the moving object; and
said update unit updates the stored position and velocity of the moving object in accordance with the calculated acceleration.

3. The game apparatus according to claim 2, wherein:
said storage unit stores a reference frictional force at each position on the road and
said calculation unit calculates the acceleration of the moving object by obtaining a frictional force given on the moving object utilizing the stored reference frictional force at the stored position of the moving object.

4. The game apparatus according to claim 2, further comprising a display unit, wherein
said display unit displays at least one of the stored position and velocity of the moving object.

5. The game apparatus according to claim 2, wherein
said calculation unit calculates the acceleration of the moving object by obtaining a frictional force given on the moving object in accordance with the estimated passage number.

6. The game apparatus according to claim 5, wherein
said calculation unit calculates the acceleration of the moving object in a manner that the acceleration increases as the estimated passage number increases.

7. The game apparatus according to claim 6, wherein:
said storage unit further stores an objective route within the road;
said update unit updates the objective route that was stored in accordance with the passage number that was stored of the moving object; and
a display unit displays objective route that was stored.

8. A game method for a processing apparatus including an input reception unit, a calculation unit and an update unit for moving a moving object on a road in a virtual world, wherein line segments extend between the edges of the road and each of the line segments is divided into line segment regions, and for each neighboring pair of the line segments, the end points of the regions of the first line segment of the pair and the end points of the regions of the second line segment of the pair are connected sequentially from both the edges of the pair and quadrilateral areas or triangular areas are formed, by using a storage unit for storing a position and a velocity of the moving object passage numbers, each of which represents a number of times the moving object passed through each of the regions, said method comprising:

an input receiving step of receiving an operational input from a player on the input reception unit;
a calculating step performed by the calculation unit of checking in which quadrilateral area or triangular area the moving object is included, estimating a passage number representing a number of times the moving object passed at the stored position of the moving object from the stored passage numbers of the one or two regions of the area including the moving object, and calculating an influence on the moving object, based on the received operational input from the player, the stored position of the moving object, and the estimated passage number; and
an updating step performed by the updating unit of updating the stored position and the stored velocity of the moving object in accordance with the calculated influence and incrementing the stored passage number of the region which is intersected by a line connecting the previous position and the updated position of the moving object, and wherein,
(a) the passage number for each triangular area having one line segment region for which passage number L has been stored is estimated as L by the calculation unit; and
(b) each quadrilateral area bounded by two line segment regions for one of which passage number M has been stored and for the other of which passage number N (where M is less than N) has been stored is divided in the calculation unit so that N−M+1 number of small quadrilateral areas are arrayed in a row and one end of the row is defined by the line segment region with the stored passage number M and other end of the row is defined by the line segment region with the stored passage number N, and estimates respective passage numbers of the arrayed small quadrilateral areas, ranging from the stored passage number M to the stored passage number N, incrementing by 1, respectively in order from one small quadrilateral area at said one end of the row to another small quadrilateral area at the other end of the row.

9. A computer-readable information recording medium storing a program, in order to move a moving object on a road in a virtual world, wherein line segments extend between the edges of the road and each of the line segments is divided into line segment regions for each neighboring pair of the line segments, the end points of the regions of the first line segment of the pair and the end points of the regions of the second line segment of the pair are connected sequentially from both the edges of the pair and quadrilateral areas or triangular areas are formed, said program controlling a computer to function as:

an input reception unit which receives an operational input from a player;
a storage unit which stores a position and a velocity of a moving object and passage numbers, each of which represents a number of times the moving object passed through each of the regions;

a calculation unit which checks in which quadrilateral area or triangular area the moving object is included, estimates a passage number representing a number of times the moving object passed at the stored position of the moving object from the stored passage number of the one or two regions of the area including the moving object, and calculates an influence on the moving object based on the received operational input from the player, the stored position of the moving object, and the estimated passage number; and an update unit which updates the stored position and the stored velocity of the moving object in accordance with the calculated influence, and increments the stored passage number of the region which is intersected by a line connecting the previous position and the updated position of the moving object, and wherein, said calculation unit (a) estimates the passage number for each triangular area having one line segment region for which passage number L has been stored, as L; and (b) divides each quadrilateral area bounded by two line segment regions for one of which passage number M has been stored and for the other of which passage number N (where M is less than N) has been stored so that N−M+1 number of small quadrilateral areas are arrayed in a row and one end of the row is defined by the line segment region with the stored passage number M and other end of the row is defined by the line segment region with the stored passage number N, and estimates respective passage numbers of the arrayed small quadrilateral areas, ranging from the stored passage number M to the stored passage number N, incrementing by 1, respectively in order from one small quadrilateral area at said one end of the row to another small quadrilateral area at the other end of the row.

* * * * *

UNITED STATES PATENT AND TRADEMARK OFFICE
CERTIFICATE OF CORRECTION

PATENT NO. : 7,601,055 B2  Page 1 of 1
APPLICATION NO. : 10/813211
DATED : October 13, 2009
INVENTOR(S) : Takuro Eika It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 842 days.

Signed and Sealed this

Fifth Day of October, 2010

David J. Kappos
*Director of the United States Patent and Trademark Office*